US007661092B1

(12) United States Patent
Bottomley et al.

(10) Patent No.: US 7,661,092 B1
(45) Date of Patent: Feb. 9, 2010

(54) INTELLIGENT REUSE OF LOCAL VARIABLES DURING BYTECODE COMPILATION

(75) Inventors: T. Mark W. Bottomley, Orleans (CA); Peter W. Burka, Ottawa (CA); Olivier P. Thomann, Gatineau (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/346,722

(22) Filed: Dec. 30, 2008

(51) Int. Cl.
*G06F 9/44* (2006.01)
(52) U.S. Cl. .................................. 717/118; 717/126
(58) Field of Classification Search ................ 717/116, 717/118, 126, 148
See application file for complete search history.

(56) References Cited

U.S. PATENT DOCUMENTS

| | | | | |
|---|---|---|---|---|
| 6,282,698 | B1 * | 8/2001 | Baker et al. ................. | 717/118 |
| 6,477,702 | B1 * | 11/2002 | Yellin et al. ................. | 717/126 |
| 6,964,039 | B2 * | 11/2005 | Heeb .......................... | 717/148 |
| 7,120,572 | B1 * | 10/2006 | Liang .......................... | 703/26 |
| 7,130,972 | B2 * | 10/2006 | Yamamoto et al. .......... | 711/156 |
| 7,171,655 | B2 | 1/2007 | Gordon et al. | |
| 2005/0028132 | A1 * | 2/2005 | Srinivasamurthy et al. .. | 717/100 |
| 2006/0048095 | A1 | 3/2006 | Meijer et al. | |
| 2006/0070049 | A1 * | 3/2006 | Chung ......................... | 717/148 |
| 2009/0064114 | A1 | 3/2009 | Bottomley et al. | |

OTHER PUBLICATIONS

Binder et al. "Flexible and Efficient Measurement of Dynamic Bytecode Metrics", Oct. 2006, ACM, pp. 171-180.*
Stata et al. "A Type System for Java Bytecode Subroutines", Jan. 1999, ACM TOPLAS vol. 21, Issue 1, pp. 90-137.*
Klein et al. "A Machine-Checked Model for a Java-Like language, Virtual Machine, and Compiler", Jul. 2006, ACM TOPLAS vol. 28, Issue 4, pp. 619-695.*
Leroy, X., "Bytecode Verification on Java Smart Cards," [online] Software—Practice & Experience, vol. 32, No. 4, pp. 319-340, Apr. 2002, [retrieved Dec. 29, 2008] retrieved from the Internet: <http://gallium.inria.fr/~xleroy/publi/oncard-verifier-spe.pdf>. See, Abstract; p. 6, para. 4, beginning "Also, an . . . "; Requirement R2, p. 7, para. 4; p. 11, sec. 4, Off-Card Code Transformations; Fig. 3.

* cited by examiner

*Primary Examiner*—Anna Deng
(74) *Attorney, Agent, or Firm*—Patents On Demand, PA; Brian K. Buchheit

(57) ABSTRACT

A source code file can be compiled to generate bytecode. During compilation, a first use of a local variable within a set of instructions of the source code can be detected. A local variable usage list can be examined for at least one inactive local variable in use by the set of instructions. An existence of an acceptable type pairing between a type descriptor corresponding to a local variable and a type descriptor of the local variable may be determined. When the acceptable type pairing exists, an index of the local variable array corresponding to the determined acceptable type pairing for the local variable can be reused. Otherwise, a new index can be assigned for the local variable. Compiling bytecode in this manner avoids extraneous class loads that would otherwise occur during a verification phase of the bytecode, which has still been optimized to reuse local variable slots.

6 Claims, 2 Drawing Sheets

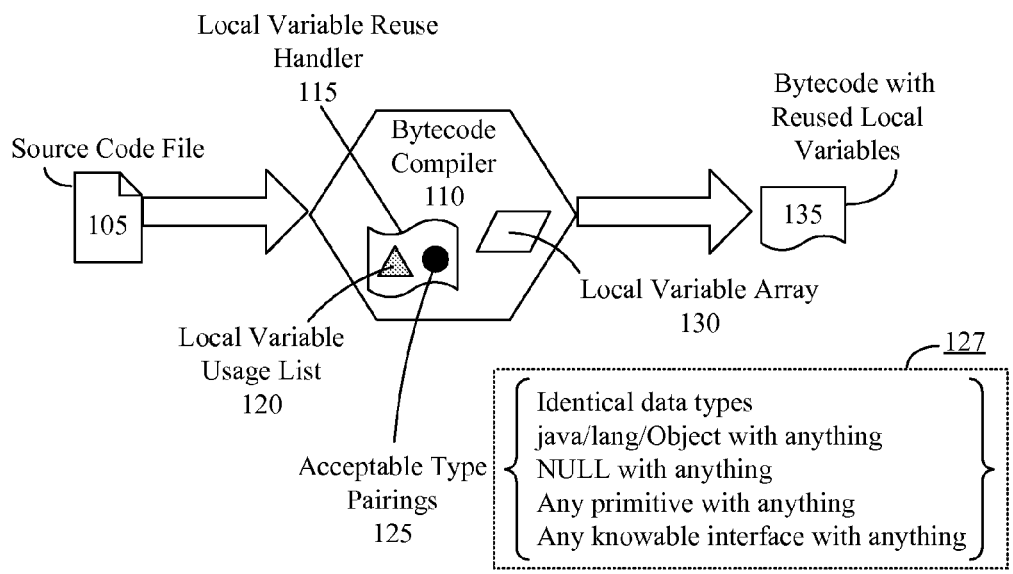

```
//* Algorithm to select a local variable index for a new local variable. *//    140 if new local variable usage starts then
        if "already used" local variables are not all "active" then
                check "inactive" variables for an acceptable pairing
                if acceptable pairing found then
                        assign new variable to index of pairing partner
                else
                        if target is minimal bytecode footprint then
                                use any available pairing
                        else
                                assign new variable to next unused index and add to the "already
                                used" set
                        end if
                end if
        else
                assign new variable to next unused index and add to the "already used" set
        end if
end if
```

FIG. 1

INTELLIGENT REUSE OF LOCAL VARIABLES DURING BYTECODE COMPILATION

BACKGROUND

The present invention relates to the field of bytecode verification, and, more particularly, to intelligently reusing local variables to reduce extraneous class loads during bytecode verification.

Many programming languages, such as JAVA and SMALLTALK, generate bytecode from user-input software code for use by a bytecode interpreter such as the JAVA VIRTUAL MACHINE (JVM). Bytecode is an instruction set that contains the encoded results of the parsing and semantic analysis of the user-entered program code objects. Prior to execution by the bytecode interpreter, the bytecode is verified to ensure that the structural and static constraints of the bytecode interpreter are met. Verification is a compiler independent process that checks that a class satisfies the structural and static constraints of the computing space (e.g., a JVM) within which the bytecode executes.

A data-flow verification process can perform symbolic execution of the bytecode of each method and creates intermediate data known as a stack maps. These maps are merged at data-flow join points. The merging of local variables in a method requires that incompatible local variables be merged to "Top," which is an indication that the local variable is unusable. That is, if Local Variable_1 contains an int on one execution path and if Local Variable_1 contains a java/lang/String on another path, then the resulting merge entry will be "Top". This makes the local variable unusable until it has been loaded with a new variable.

Verification can often merge a local variable slot containing different classes. These classes are merged by the verifier in an attempt to identify the least common super-class. Many times, the merges will be valid and loading each class along with its full hierarchy is required. For instance, class/class mergers where each class is different and neither is JAVA/LANG/OBJECT will result in loading the complete hierarchy for both object types. Compiler optimizations often cause unnecessary merges by reusing a local variable memory store for variables that have non-overlapping scopes on different execution paths. These unnecessary class/class merges negatively affect the application start-up and memory usage.

Attempts at overcoming this problem have had a limited effect upon the verification process. One solution employed by the J9 Virtual Machine detects the non-trivial merge of local variables and performs a forward walk through the bytecode to check the future liveliness of the local variable slot to see if it is ever read again before being over-written. While helpful, this solution incurs additional overhead when determining the future liveliness of the local variable slot.

BRIEF DESCRIPTION OF THE SEVERAL VIEWS OF THE DRAWINGS

FIG. 1 is a schematic diagram of a system that intelligently reuses local variables in accordance with an embodiment of the inventive arrangements disclosed herein.

DETAILED DESCRIPTION

Figure 2:
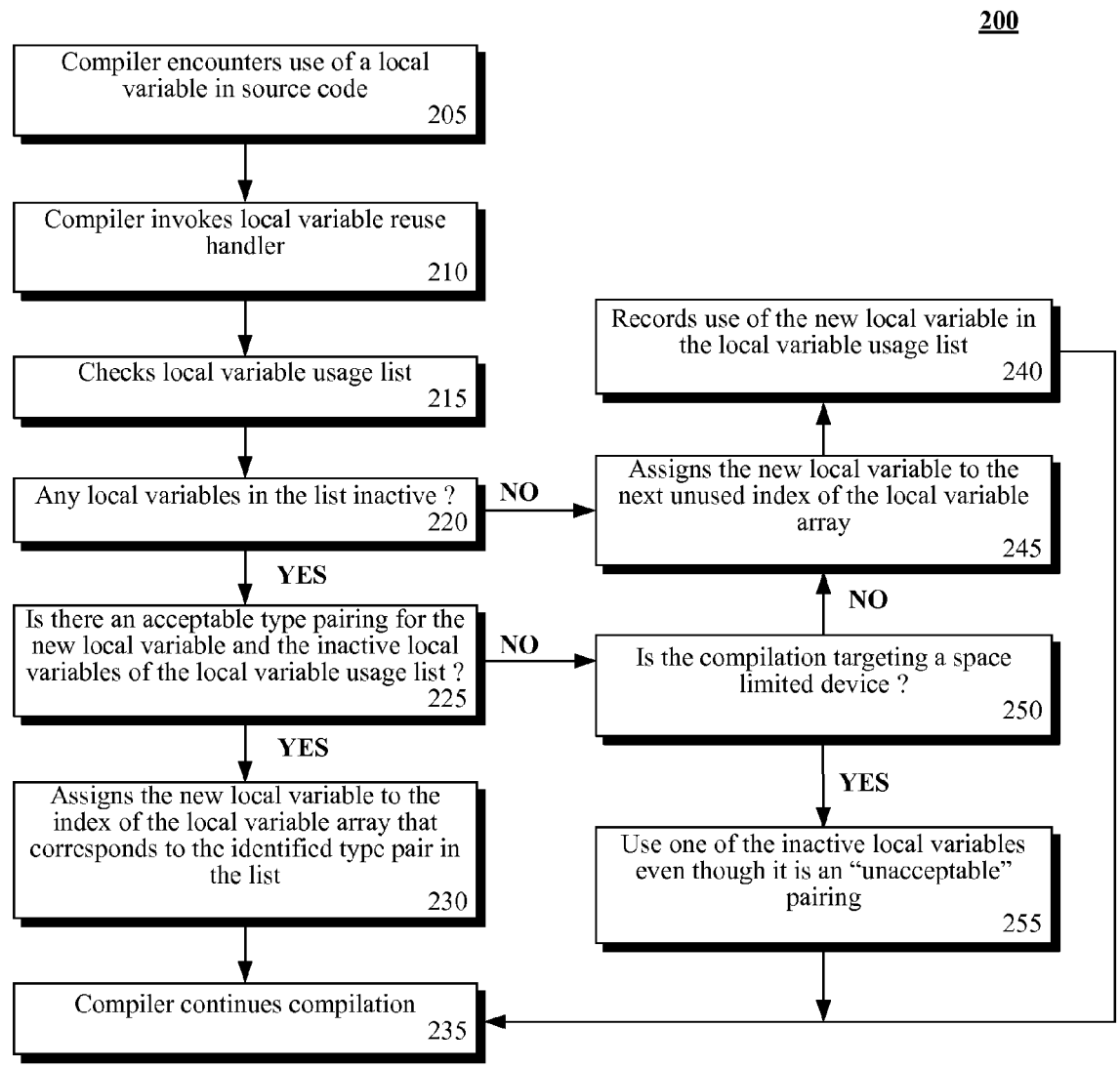
FIG. 2 is a flow chart of a method that reuses local variables to ensure a verifier is presented with trivial merges that do not require loading additional classes and their hierarchies in accordance with an embodiment of the inventive arrangements disclosed herein.

The present disclosure describes a solution that minimizes class loads required during bytecode verification by intelligently reusing variables at compile time. In the solution, before bytecode is generated, a check for acceptable type pairings occurs before local variables reuse is permitted. More specifically, when a compiler creates the use of a local variable in source code, it can invoke a local variable reuse handler, which determines if any inactive variables exist that can be reused. If so, a check is performed to determine whether an acceptable type pairing for the new local variable is possible. An acceptable type pairing can be a pairings having merge points containing trivially mergable contents (i.e., merge points that do not reuse a local variable slot containing a sub-class of JAVA/LANG/OBJECT for another, different sub-class of JAVA/LANG/OBJECT). Hence, acceptable pairings can include identical data types, a pairing of a JAVA/LANG/OBJECT with anything, a pairing of NULL with anything, a pairing of a primitive with anything, and a pairing of any knowable interface (i.e., one that the verifier treats as an interface as JAVA/LANG/OBJECT for merge purposes) with anything. Trivial merges of an acceptable type pairing do not require loading of additional classes and their hierarchies during a bytecode verification phase.

The present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. The computer-usable or computer-readable medium may be a computer readable storage medium that can include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk-read only memory (CD-ROM), compact disk-read/write (CDRIW) and DVD. Other computer-readable medium can include a transmission media, such as those supporting the Internet, an intranet, or a personal area network (PAN). Transmission media can include an electrical connection having one or more wires, an optical fiber, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, for instance, via optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram of a system 100 that intelligently reuses local variables in accordance with an embodiment of the inventive arrangements disclosed herein. More specifically, local variables can be reused intelligently at compile time to ensure only trivial merges occur at verification time.

In system 100, a source code file 105 can be received for processing by a bytecode compiler 110. The compiler 110 can include a local variable reuse handler 115. The handler 115 can check a local variable usage list 120 to determine whether any inactive local variables having acceptable type pairings 125, in which case a discovered local variable can be reused. Else, a new local variable can be added to the local variable array 130, from which bytecode 135 is generated.

Acceptable type pairings 125 can include any pairing that results in a trivial merge that does not require loading of additional classes and their hierarchies. For example 127, acceptable type pairings 125 can include identical data types, a pairing of a JAVA/LANG/OBJECT with anything, a pairing of NULL with anything, a pairing of a primitive with anything, and a pairing of any knowable interface (i.e., one that the verifier treats as an interface as JAVA/LANG/OBJECT for merge purposes) with anything.

The local variable reuse handler 115 can be adjusted to consider additional implementation specific features. For example, in a JAVA MICRO EDITION (JME) embodiment, a preference can exist to minimize the footprint of the class file. Therefore, the resource handler 115 can be qualified to not perform compilation changes for JME targeted classes if it would increase the number of local variables. (e.g., Bytecodes to access local variables 0-3 are one byte long and bytecodes to access local variables 4-255 are two bytes long.) Thus, a constraint can be added for a JVM environment, which ensures local variables are assigned without growing the bytecodes in a manner that improves load times.

Pseudo code example 140 shows a contemplated algorithm that can be used by local variable reuse handler 115. Example 140 includes a constraint (e.g., minimal bytecode footprint) that may be used for a JME environment, such as an environment that conforms to a Connected Limited Device Configuration (CLDC) specification.

Implementation of a local resource handler 115 that intelligently reuses local variables in a compiler 110, as is shown in system 100, have an advantage of the compiler 110 having full visibility to the local variable types and scopes. It also has the advantage of removing problems from compiled classes permanently, in that each time bytecode 135 executes, problems with non-trivial merges at verification are avoided.

Implementations of the disclosure are, however, contemplated where an algorithm similar to that of pseudo code 140 is executed by a component other than the compiler 110. For example, an external tool, such as JaPT (JAVA OPTIMIZER), can be used to rewrite existing classes to avoid problematic merges. Such an implementation would not require access to the source 105, since manipulations are able to be performed directly on the class file representation. Hence, legacy class files can be 'fixed' using an embodiment of the disclosure.

It should be noted that the technique exemplified by algorithm 140 can be utilized in situations having merge points where more than two paths meet. For instance, the technique can be utilized at the end of a switch statement, where all switch elements converge. Appreciably, switch statements often deal with the same type in each case entry, which results in trivial identity merges.

FIG. 2 is a flow chart of a method 200 that reuses local variables to ensure a verifier is presented with trivial merges that do not require loading additional classes and their hierarchies in accordance with an embodiment of the inventive arrangements disclosed herein. Method 200 can be performed in context of system 100.

Method 200 can begin in step 205, where a compiler can encounter a use of a local variable in source code. In step 210, the compiler can invoke a local variable reuse handler, which checks a local variable usage list in step 215. A check to determine if any local variables in the list are inactive, meaning that they have been previously used but are not otherwise active. When inactive local variables are found, the method 300 can progress from step 220 to step 225, else to step 245.

In step 225, a determination can be made as to whether there is an acceptable type pairing for the new local variable and one of the inactive local variables. An acceptable type pairing can be one resulting in a trivial merger. When an acceptable pairing is found, step 230 can occur, else step 250.

In step 230, the new local variable can be assigned to the index of the local variable array that corresponds to the inactive local variable identified as acceptable. Thus, the acceptable local variable is reused in a manner that ensures a verifier will not load additional classes and hierarchies when verifying compiled bytecode.

When no acceptable local variable is discovered in step 225, optional step 250 can execute. Step 250 shows a situation where it is important to avoid growing bytecode footprint, which may be important in a resource constrained environment, such as JME. Step 250 only assigns a new variable to a predetermined local variable array index for a local variable already in use (e.g., step 245), when minimal bytecode footprint is not chosen, as shown in step 250. Otherwise, one of the inactive local variables can be reused, even though it was determined to result in an "unacceptable" pairing, as shown by step 255. When growing bytecode footprint is not an important constraint, a negative result of step 225 can result in the method proceeding directly to step 245. In step 240, use of the new local variable can be recorded in a local variable usage list.

The diagrams in FIGS. 1-2 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for intelligently reusing local variables expressed when compiling a bytecode, comprising:
    detecting a first use of a local variable within a plurality of programmatic instructions, wherein the programmatic instructions are expressed as the bytecode when executed;
    checking a local variable usage list, wherein checking the local variable usage list comprising:
        determining whether an inactive local variable in use by the plurality of instructions exists having an acceptable type pairing with the detected local variable;
        when the acceptable type pairing is determined to exist, reusing the inactive local variable by assigning an index of the inactive local variable to the detected local variable; and
        when the acceptable type pairing is not determined to exist, assigning a next unused index to the detected local variable, and recording the detected local variable in the local variable usage list, and
        wherein the assigned indexes are indexes to a local variable slot in existence when the bytecode executes, wherein before the bytecode executes the bytecode is verified, wherein the acceptable type pairing is a pairing in which when verification merges a local variable slot based upon the pairing, and the merge does not require a loading of additional classes and their associated hierarchies.

2. The method of claim 1, wherein the acceptable type pairing of the inactive local variable and the detected local variable comprises one of:

a pairing where type descriptors of the inactive local variable and the detected local variable are identical;

a pairing where at least one of the inactive local variable and the detected local variable has a JAVA/LANG/OBJECT type descriptor;

a pairing where at least one of the inactive local variable and the detected local variable has a NULL type descriptor;

a pairing where at least one of the inactive local variable and the detected local variable has a primitive type descriptor; and a pairing where at least one of the inactive local variable and the detected local variable has a known interface for a descriptor that a verifier treats as JAVA/LANG/OBJECT for merge purposes.

3. The method of claim 1, further comprising:

when an acceptable type pairing is not determined to exist and before assigning the next unused index to the detected local variable, determining if minimal bytecode footprint is required; and only assigning the next unused index when a minimal bytecode footprint is not a goal, otherwise reusing one of the inactive local variables by assigning an index of one of the inactive local variables to the detected local variable.

4. A computer program product for intelligently reusing local variables expressed when compiling a bytecode, said computer program product comprising a computer readable storage medium having computer usable program code embodied therewith, the computer usable program code comprising:

computer usable program code configured to detect a first use of a local variable within a plurality of programmatic instructions, wherein the programmatic instructions are expressed as the bytecode when executed;

computer usable program code configured to check a local variable usage list, wherein the computer usable program code configured to check the local variable usage list comprising:

computer usable program code configured to determine whether an inactive local variable in use by the plurality of instructions exists having an acceptable type pairing with the detected local variable;

computer usable program code configured to, when the acceptable type pairing is determined to exist, reuse the inactive local variable by assigning an index of the inactive local variable to the detected local variable; and computer usable program code configured to, when the acceptable type pairing is not determined to exist, assign a next unused index to the detected local variable, and record the detected local variable in the local variable usage list, and wherein the assigned indexes are indexes to a local variable slot in existence when the bytecode executes, wherein before the bytecode executes the byte code is verified, wherein the acceptable type pairing is a pairing in which when verification merges a local variable slot based upon the pairing, the merge does not require a loading of additional classes and their associated hierarchies.

5. The computer program product of claim 4, wherein the acceptable type pairing of the inactive local variable and the detected local variable comprises one of:

a pairing where type descriptors of the inactive local variable and the detected local variable are identical;

a pairing where at least one of the inactive local variable and the detected local variable has a JAVA/LANG/OBJECT type descriptor;

a pairing where at least one of the inactive local variable and the detected local variable has a NULL type descriptor;

a pairing where at least one of the inactive local variable and the detected local variable has a primitive type descriptor; and a pairing where at least one of the inactive local variable and the detected local variable has a known interface for a descriptor that a verifier treats as JAVA/LANG/OBJECT for merge purposes.

6. The computer program product of claim 4, further comprising:

computer usable program code configured to, when an acceptable type pairing is not determined to exist and before assigning the next unused index to the detected local variable, determine if minimal bytecode footprint is required; and computer usable program code configured to only assign the next unused index when a minimal bytecode footprint is not the goal, otherwise the computer usable program code is configured to reuse one of the "unacceptable" inactive local variables by assigning an index of one of the inactive local variables to the detected local variable.

* * * * *